United States Patent
Morita et al.

(10) Patent No.: US 10,920,659 B2
(45) Date of Patent: Feb. 16, 2021

(54) TURBOCHARGER

(71) Applicant: IHI Corporation, Koto-ku (JP)

(72) Inventors: Isao Morita, Koto-ku (JP); Wataru Sato, Koto-ku (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 16/471,034

(22) PCT Filed: Feb. 16, 2018

(86) PCT No.: PCT/JP2018/005549
§ 371 (c)(1),
(2) Date: Jun. 19, 2019

(87) PCT Pub. No.: WO2018/151267
PCT Pub. Date: Aug. 23, 2018

(65) Prior Publication Data
US 2020/0040812 A1 Feb. 6, 2020

(30) Foreign Application Priority Data

Feb. 16, 2017 (JP) .................................. 2017-026876

(51) Int. Cl.
*F02B 37/18* (2006.01)
*F01D 9/02* (2006.01)
*F02B 37/02* (2006.01)

(52) U.S. Cl.
CPC ............ *F02B 37/183* (2013.01); *F01D 9/026* (2013.01); *F02B 37/025* (2013.01);
(Continued)

(58) Field of Classification Search
CPC ...... F02B 37/18; F02B 37/183; F02B 37/186; F02B 37/12; F02B 37/025; F01D 9/026;
(Continued)

(56) References Cited

U.S. PATENT DOCUMENTS 3,423,926 A  * 1/1969 Holzhausen .......... F02B 37/183
                                                          60/602
4,544,326 A 10/1985 Nishiguchi et al.
(Continued)

FOREIGN PATENT DOCUMENTS

CN    103038479 A    4/2013
JP    56-175525      5/1980
(Continued)

OTHER PUBLICATIONS

International Search Report dated Apr. 3, 2018 in PCT/JP2018/005549, citing documents AK through AO therein, 2 pages.

*Primary Examiner* — Thai Ba Trieu
(74) *Attorney, Agent, or Firm* — Oblon, McClelland, Maier & Neustadt, L.L.P.

(57) ABSTRACT

A turbocharger includes a turbine impeller, a turbine housing which includes a scroll portion and a discharge port, a bypassing passage portion which guides a working fluid from the scroll portion to the discharge port, and a valve portion which controls the inflow of the working fluid to the bypassing passage portion. The hub side scroll is formed so that a cross-sectional area of a passage is larger than that of a shroud side scroll. The valve portion includes a hub side valve which controls the inflow of the working fluid from the hub side scroll to the bypassing passage portion and a shroud side valve which controls the inflow of the working fluid from the shroud side scroll to the bypassing passage portion. An operation of opening and closing the hub side valve is independent from an operation of opening and closing the shroud side valve.

8 Claims, 6 Drawing Sheets

(52) U.S. Cl.
CPC ...... *F05D 2220/40* (2013.01); *F05D 2250/52* (2013.01); *F05D 2260/606* (2013.01)

(58) Field of Classification Search
CPC ............. F01D 2220/40; F01D 2250/52; F01D 2260/606
USPC .......................................................... 60/602
See application file for complete search history.

(56) References Cited

U.S. PATENT DOCUMENTS

| | | | | |
|---|---|---|---|---|
| 4,719,757 A | * | 1/1988 | Nakazawa | ............ F02B 37/025 60/602 |
| 5,046,317 A | * | 9/1991 | Satokawa | ............. F02B 37/183 60/602 |
| 8,695,338 B2 | * | 4/2014 | Sato | ...................... F02B 37/183 60/602 |
| 2009/0028694 A1 | | 1/2009 | Naemura et al. | |
| 2011/0175025 A1 | | 7/2011 | Schall | |
| 2014/0219786 A1 | * | 8/2014 | Zhu | ........................ F01D 9/026 415/151 |

FOREIGN PATENT DOCUMENTS

| | | | |
|---|---|---|---|
| JP | 60-19920 A | | 2/1985 |
| JP | 62183033 U | * | 11/1987 |
| JP | 63-117124 A | | 5/1988 |
| JP | 63-112202 U | | 7/1988 |
| JP | 3-123906 U | | 12/1991 |
| JP | 05156958 A | * | 6/1993 |
| JP | 2000064847 A | * | 2/2000 |
| JP | 2006316658 A | * | 11/2006 |
| JP | 2006-348894 A | | 12/2006 |
| JP | 2008-101589 A | | 5/2008 |
| JP | 2008-231993 A | | 10/2008 |
| JP | 2009-287434 A | | 12/2009 |
| JP | 2013-2302 A | | 1/2013 |
| JP | 2013-113149 A | | 6/2013 |

* cited by examiner

TURBOCHARGER

TECHNICAL FIELD

The disclosure relates to a turbocharger. This application is based on Japanese Patent Application No. 2017-026876 filed on Feb. 16, 2017. This application claims benefit of priority to the application. The contents described in the Japanese patent application are applied to the present application by reference.

BACKGROUND ART

As a technique of this field, a turbo charger including a bypassing passage is known (Patent Literatures 1 to 5). Patent Literature 1 discloses a turbo charger including a waste gate valve and an exhaust gas pipe passage. The turbo charger suppresses a valve body from being vibrated and suppresses a gas from leaking between the valve body and a turbine housing. As a result, the turbo charger of Patent Literature 1 improves durability and reliability. Patent Literature 2 discloses a twin nozzle type turbine device. The turbine device is contrived by focusing on a flow amount of a nozzle guiding an exhaust gas to a turbine wheel. As a result, the turbine device of Patent Literature 2 improves the efficiency of the turbine in a broad band. Patent Literature 3 discloses an exhaust device applied to a twin scroll type turbocharger. The exhaust device includes a bypassing passage. The exhaust device is contrived by focusing on an outlet shape of the bypassing passage. As a result, the exhaust device is used to smoothly guide an exhaust gas from the bypassing passage. Patent Literature 4 discloses a turbo charger including a twin scroll turbine housing. The turbo charger equalizes an exhaust pressure pulsation acting on a gate valve. As a result, the turbo charger improves performance and durability. Patent Literature 5 discloses a technique relating to a material composition of assembly components of a waste gate in a case in which a turbo charger is used in a diesel engine. This turbo charger improves strength and stability of assembly components.

CITATION LIST

Patent Literature

Patent Literature 1: Japanese Unexamined Patent Publication No. 2008-101589
Patent Literature 2: Japanese Unexamined Patent Publication No. 2008-231993
Patent Literature 3: Japanese Unexamined Patent Publication No. 2013-2302
Patent Literature 4: Japanese Unexamined Patent Publication No. 2006-348894
Patent Literature 5: US Patent No. 2011/0175025

SUMMARY OF INVENTION

Technical Problem

In the field relating to the twin scroll type turbocharger including a waste gate valve mechanism, further improvement in efficiency of the turbocharger is desired. However, efficiency is deteriorated due to various losses generated inside the turbine. Here, the disclosure will describe a turbocharger including a waste gate mechanism suppressing deterioration in efficiency.

Solution to Problem

An embodiment of the disclosure is a turbocharger. The turbocharger includes: a turbine impeller which rotates by using a predetermined axis as a rotation axis; a housing which includes a scroll portion formed to surround the turbine impeller and supplying a working fluid to the turbine impeller and a discharge portion discharging the working fluid passing through the turbine impeller; a bypassing passage portion of which one end is connected to the scroll portion and the other end is connected to the discharge portion and which guides the working fluid from the scroll portion to the discharge portion; and a valve portion which is provided in the bypassing passage portion and controls the inflow of the working fluid from the scroll portion to the discharge portion. The scroll portion includes a first scroll and a second scroll. The first scroll is formed so that a cross-sectional area of a passage is larger than that of the second scroll. The valve portion includes a first valve and a second valve. The first valve controls the inflow of the working fluid from the first scroll to the bypassing passage portion. The second valve controls the inflow of the working fluid from the second scroll to the bypassing passage portion. An operation of the first valve is independent from an operation of the second valve.

Effects of Invention

A turbocharger of the disclosure can suppress deterioration in efficiency.

BRIEF DESCRIPTION OF DRAWINGS

FIG. 3(*a*) is a cross-sectional view illustrating a first state of a waste gate mechanism, FIG. 3(*b*) is a cross-sectional view illustrating a second state of the waste gate mechanism, and FIG. 3(*c*) is a cross-sectional view illustrating a third state of the waste gate mechanism.

DESCRIPTION OF EMBODIMENTS

An embodiment of the disclosure is a turbocharger. The turbocharger includes: a turbine impeller which rotates by using a predetermined axis as a rotation axis; a housing which includes a scroll portion formed to surround the turbine impeller and supplying a working fluid to the turbine impeller and a discharge portion discharging the working fluid passing through the turbine impeller; a bypassing passage portion of which one end is connected to the scroll portion and the other end is connected to the discharge portion and which guides the working fluid from the scroll portion to the discharge portion; and a valve portion which is provided in the bypassing passage portion and controls the inflow of the working fluid from the scroll portion to the discharge portion. The scroll portion includes a first scroll and a second scroll. The first scroll is formed so that a cross-sectional area of a passage is larger than that of the second scroll. The valve portion includes a first valve and a second valve. The first valve controls the inflow of the working fluid from the first scroll to the bypassing passage portion. The second valve controls the inflow of the working fluid from the second scroll to the bypassing passage portion. An operation of the first valve is independent from an operation of the second valve.

The turbocharger guides a working fluid provided from an internal combustion engine to the turbine impeller through the scroll portion of the housing. Then, the working fluid is discharged from the discharge portion of the housing. Here, the first scroll is formed so that the cross-sectional area of the passage is larger than that of the second scroll. As a result, the state of the working fluid flowing in the first scroll and the state of the working fluid flowing in the second scroll can be set to be different from each other on purpose. Then, a part of the working fluid is guided from the scroll portion to the discharge portion through the bypassing passage portion without passing through the turbine impeller in response to the state of the working fluid flowing in each scroll. Here, the inflow of the working fluid to the bypassing passage portion is controlled by the first valve and the second valve. The first valve and the second valve are provided so that one operation is independent from the other operation. That is, it is possible to open the second valve while closing the first valve. Accordingly, it is possible to perform the valve control independent for each scroll so as to obtain a desired working fluid state. Thus, it is possible to suppress deterioration in efficiency of the turbocharger.

In some aspects, the valve portion includes a first state in which the first valve and the second valve are closed so that the inflow of the working fluid from the first scroll and the second scroll to the bypassing passage portion is stopped and a second state in which the first valve is closed and the second valve is opened so that the inflow of the working fluid from the first scroll to the bypassing passage portion is stopped and the inflow of the working fluid from the second scroll to the bypassing passage portion is allowed. The valve portion may set the first state when a control variable is equal to or smaller than a first threshold value and set the second state when the control variable is larger than the first threshold value. According to this configuration, the valve portion is controlled by using control variables such as a pressure and a flow amount indicating the state of the turbocharger and the internal combustion engine including the turbocharger. Thus, it is possible to perform the valve control corresponding to each scroll. As a result, the turbocharger can appropriately suppress deterioration in efficiency.

In some aspects, the valve portion further includes a third state in which the first valve and the second valve are opened so that the inflow of the working fluid from the first scroll and the second scroll to the bypassing passage portion is allowed. The valve portion may set the third state when the control variable is larger than a second threshold value which is larger than the first threshold value. According to this configuration, it is possible to perform the valve control corresponding to each scroll. Thus, it is possible to further appropriately suppress deterioration in efficiency of the turbocharger.

In some aspects, the second scroll may be disposed near the discharge portion in relation to the first scroll in the axial direction. According to this configuration, it is possible to perform the valve control corresponding to each scroll in the compact turbocharger.

Further, a turbocharger which is an embodiment of the disclosure includes: a hub side scroll; a shroud side scroll which separates from the hub side scroll by a partition wall portion and having a cross-sectional area different from that of the hub side scroll; and a waste gate mechanism which includes a hub side bypassing hole communicating with the hub side scroll, a hub side valve disposed in the hub side bypassing hole, a shroud side bypassing hole communicating with the shroud side scroll and a shroud side valve disposed in the shroud side bypassing hole. The hub side valve and the shroud side valve are independently controlled.

In some aspects, when a control variable of a working fluid flowing to one of the hub side scroll and the shroud side scroll is larger than a first threshold value, one corresponding valve of the hub side valve and the shroud side valve may be opened and the other valve may be closed. Further, in some aspects, when the control variable of the working fluid flowing to the other of the hub side scroll and the shroud side scroll is larger than a second threshold value which is larger than the first threshold value, the other valve of the hub side valve and the shroud side valve may be opened.

Hereinafter, a turbocharger according to the disclosure will be described in detail with reference to the accompanying drawings. In the description of the drawings, the same reference numerals will be given to the same components and a repetitive description thereof will be omitted.

Figure 1:
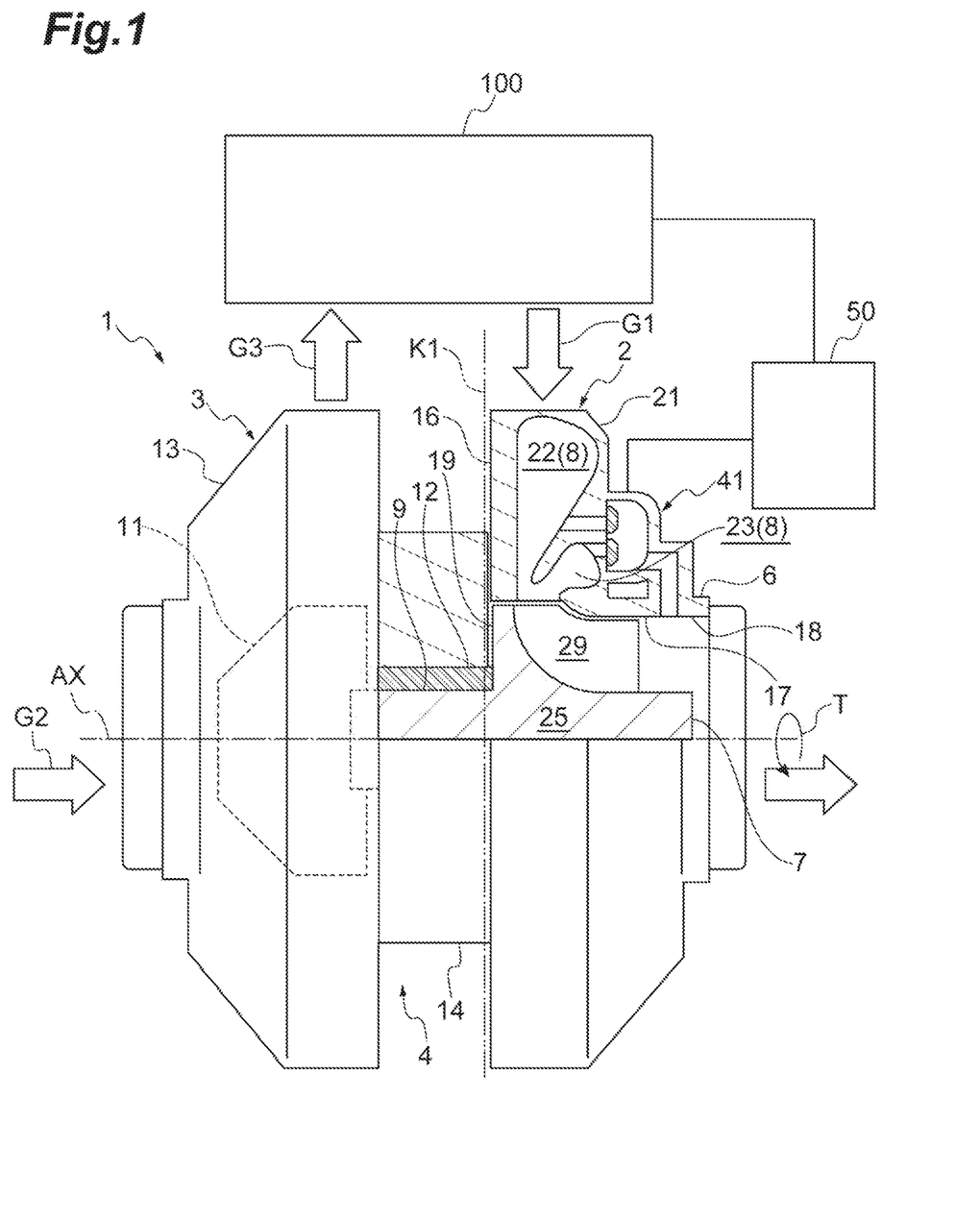
FIG. 1 is a schematic diagram of a system including a turbocharger according to the disclosure.

As illustrated in FIG. 1, a turbocharger 1 is used in, for example, an internal combustion engine 100 of a vehicle. For example, the turbocharger 1 is used in the internal combustion engine 100 with a small size. The turbocharger 1 includes a turbine 2, a compressor 3, and a connection portion 4.

The turbine 2 includes a turbine housing 6 and a turbine impeller 7. The turbine housing 6 includes a scroll portion 8 which extends in the circumferential direction of the inner circumferential edge portion. Further, the turbine 2 guides a working fluid G1 to the turbine impeller 7 by the scroll portion 8. The turbine impeller 7 is provided in the turbine housing 6 to be rotatable. Further, the turbine impeller 7 converts the energy of the working fluid G1 into rotational energy. The turbine impeller 7 is provided in one end of the shaft 9. A compressor impeller 11 is provided in the other end of the shaft 9. The shaft 9 is supported by a bearing 12 to be rotatable. The bearing 12 is disposed in a bearing housing 14. The bearing housing 14 is provided between the turbine impeller 7 and the compressor impeller 11. The bearing housing 14 constitutes the connection portion 4. The connection portion 4 is provided between the turbine housing 6 and the compressor housing 13.

The turbocharger 1 receives the working fluid G1 discharged from the internal combustion engine 100. Then, the turbocharger 1 supplies the working fluid G1 to the turbine impeller 7 through the turbine housing 6. The turbine impeller 7 converts the energy of the working fluid G1 into rotational energy of the shaft 9. When the shaft 9 rotates, the compressor impeller 11 rotates. The compressor impeller 11 compresses a fluid G2 (for example, air) by using the rotational energy. As a result, the compressor impeller 11 generates a compressed fluid G3. The compressed fluid G3 is provided to the internal combustion engine 100.

Hereinafter, a configuration of the turbine 2 will be described in more detail.

Figure 2:
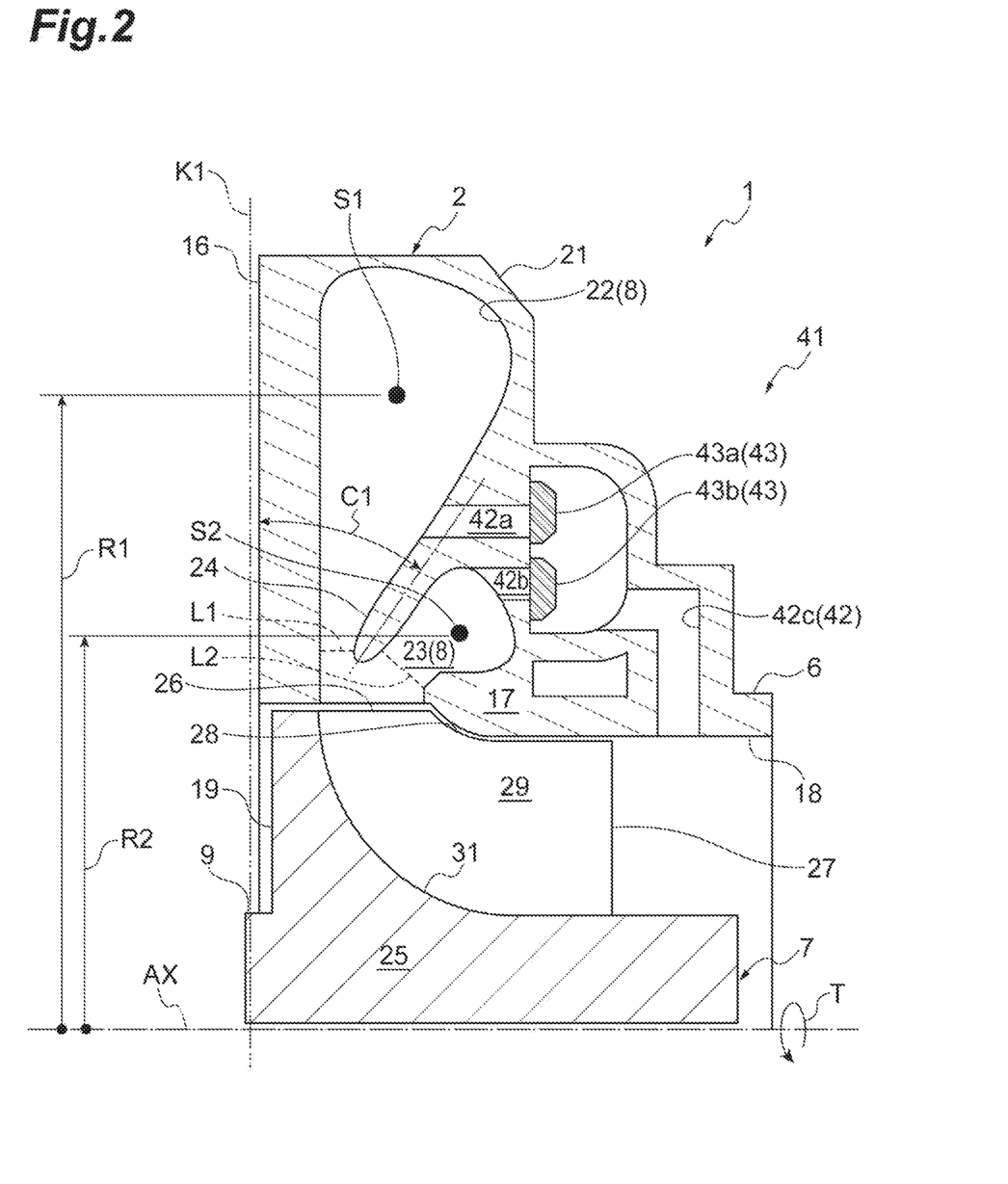
FIG. 2 is an enlarged cross-sectional view illustrating a turbine included in the turbocharger illustrated in FIG. 1.

The turbine 2 faces the compressor 3 with the bearing housing 14 interposed therebetween. As illustrated in FIG. 2, the turbine 2 includes the turbine housing 6 and the turbine impeller 7. The turbine housing 6 constitutes a base body of the turbine 2. The turbine housing 6 accommodates the turbine impeller 7.

The turbine housing 6 includes a housing end surface 16, a discharge port 18 (a discharge portion), a scroll portion 8 which guides the working fluid G1 to the turbine impeller 7, a shroud 17 which faces the turbine impeller 7, and a waste gate mechanism 41.

The housing end surface 16 faces the compressor 3. Further, the housing end surface 16 is a surface which is opposite to the discharge port 18 discharging the working fluid G1 with respect to a rotation axis AX, which is rotating in a rotational direction T. The housing end surface 16 is adjacent to a reference plane KI.

The scroll portion 8 is a passage which is formed to surround the rotation axis AX. The scroll portion 8 is surrounded by the housing end surface 16, a housing side surface 21, and the shroud 17. Thus, the scroll portion 8 is not formed at the side of the compressor 3 beyond the position of the housing end surface 16. That is, the scroll portion 8 does not largely protrude toward the compressor 3 with respect to the reference plane K1. According to such a configuration, it is possible to use a G coupling (not illustrated) for fastening the turbine housing 6 and the bearing housing 14 to each other.

The scroll portion 8 includes a hub side scroll 22 (a first scroll) and a shroud side scroll 23 (a second scroll). The hub side scroll 22 is provided near the reference plane K1. The shroud side scroll 23 is provided away from the reference plane K1 in relation to the hub side scroll 22. The hub side scroll 22 and the shroud side scroll 23 are separated from each other by a partition wall portion 24. The partition wall portion 24 extends in a direction inclined with respect to the reference plane K1. Specifically, an angle C1 which is formed by the extension direction of the partition wall portion 24 and the reference plane K1 is equal to or larger than 30° and equal to or smaller than 50°.

As described above, the scroll portion 8 is not formed near the compressor 3 in relation to the reference plane K1. It is difficult to use passages of the same configuration at the time of forming two passages in the scroll portion 8. For example, a distance from a centroid S1 of the hub side scroll 22 to the rotation axis AX is set as a distance R1. Further, a distance from a centroid S2 of the shroud side scroll 23 to the rotation axis AX is set as a distance R2. Then, the distance R1 is different from the distance R2. Further, the cross-sectional area of the hub side scroll 22 is not the same as the cross-sectional area of the shroud side scroll 23. The cross-sectional area of the hub side scroll 22 is set to be different from the cross-sectional area of the shroud side scroll 23 on purpose. Then, it is desirable to set the cross-sectional area of the hub side scroll 22 to be larger than the cross-sectional area of the shroud side scroll 23 according to the A/R value when setting the cross-sectional area of the hub side scroll 22 and the cross-sectional area of the shroud side scroll 23 to be different from each other. The A/R value is a variable which shows characteristics of the turbocharger 1. A cross-sectional area A is a cross-sectional area at a winding start position of the scroll. A distance R is a distance from the rotation axis AX to the centroid S of the cross-section of the winding start position.

The shroud 17 faces the turbine impeller 7. Thus, the shroud 17, a pair of adjacent blades 29, and a hub 25 constitute one passage. A slight gap is formed between the shroud 17 and the turbine impeller 7. As a result, the turbine impeller 7 rotates about the rotation axis AX with respect to the shroud 17.

The waste gate mechanism 41 which is a flow rate variable valve mechanism guides a part of the working fluid G1 to the discharge port 18 so as to bypass the turbine impeller 7. That is, the waste gate mechanism 41 adjusts the flow rate of the working fluid G1 flowing into the turbine impeller 7. The waste gate mechanism 41 includes a bypassing passage portion 42 and a valve portion 43.

The bypassing passage portion 42 is a passage which directly guides the working fluid G1 to the discharge port 18. The working fluid G1 flows through the hub side scroll 22 and the shroud side scroll 23. One end of the bypassing passage portion 42 is inserted through the hub side scroll 22 and the shroud side scroll 23. The other end of the bypassing passage portion 42 is inserted through the discharge port 18. The bypassing passage portion 42 includes a hub side bypassing hole 42a, a shroud side bypassing hole 42b, and a main bypassing passage 42c. One end of the hub side bypassing hole 42a is connected to the hub side scroll 22. The other end of the hub side bypassing hole 42a is connected to the main bypassing passage 42c. One end of the shroud side bypassing hole 42b is connected to the shroud side scroll 23. The other end of the shroud side bypassing hole 42b is connected to the main bypassing passage 42c. The main bypassing passage 42c is connected to the discharge port 18.

The valve portion 43 includes a hub side valve 43a (a first valve) and a shroud side valve 43b (a second valve). These valves are attached to one end of a stem. The stem (Not Shown) is supported to be rotatable with respect to the outer wall of the turbine housing 6. For example, a power transmission mechanism (Not Shown), including a link member and an operation rod is connected to a base end of the stem. This power transmission mechanism transmits a driving force generated by an actuator which is a driving source to the stem. The stem which receives the driving force performs a valve opening and closing operation. The hub side valve 43a is disposed on an opening of the hub side bypassing hole 42a communicating with the hub side scroll 22, The hub side valve 43a can take a mode of closing the hub side bypassing hole 42a and a mode of opening the hub side bypassing hole 42a. The shroud side valve 43b is disposed on an opening of the shroud side bypassing hole 42b communicating with the shroud side scroll 23. The shroud side valve 43b can take a mode of closing the shroud side bypassing hole 42b and a mode of opening the shroud side bypassing hole 42b.

Figure 3:
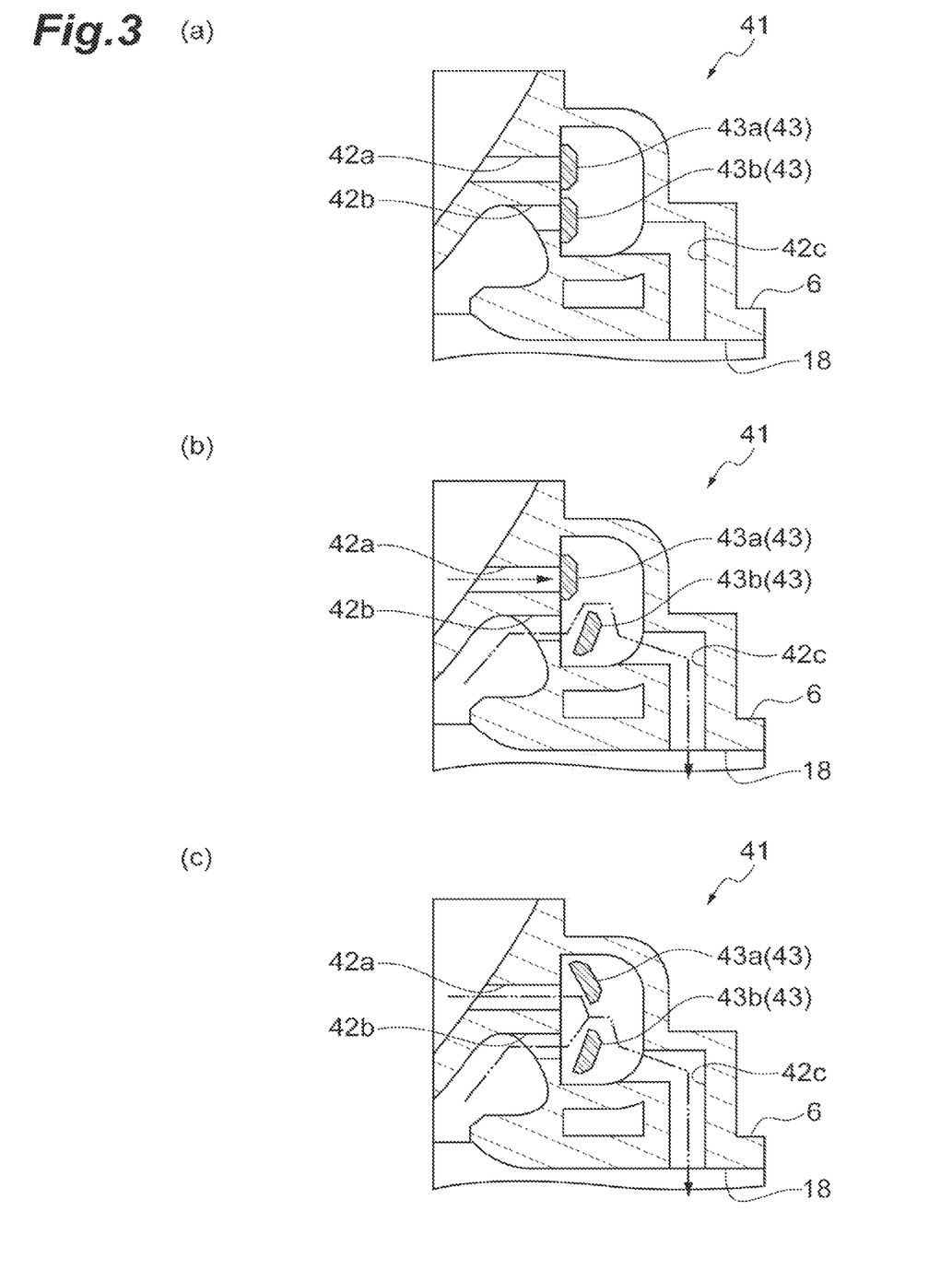

The hub side valve 43a and the shroud side valve 43b have independent configurations. The independent configurations mentioned herein mean that the hole opening and closing operations can be individually performed. Thus, the hub side valve 43a and the shroud side valve 43b are independently controlled. Thus, the valve portion 43 can take at least three modes illustrated in FIGS. 3(a), 3(b), and 3(c). First, in a first mode, the hub side valve 43a closes the hub side bypassing hole 42a and the shroud side valve 43b closes the shroud side bypassing hole 42b (see FIG. 3(a)). In a second mode, the hub side valve 43a closes the hub side bypassing hole 42a and the shroud side valve 43b opens the shroud side bypassing hole 42b (see FIG. 3(b)). Then, in a third mode, the hub side valve 43a opens the hub side bypassing hole 42a and the shroud side valve 43b opens the shroud side bypassing hole 42b (see FIG. 3(c)).

The operation of the valve portion 43 is based on a control signal provided from a control unit 50 (see FIG. 1). The control unit 50 obtains control data (control variable) such as a pressure and a flow amount from various sensors 51 provided in the turbocharger 1 or various sensors 51 provided in the internal combustion engine 100. Then, the control unit 50 determines the operation of the valve portion 43 by using the control data and a predetermined threshold value. For example, the control unit 50 may use an outlet pressure of the compressor 3 as the control data. Additionally, the control data is not limited to the outlet pressure of the compressor 3 and different data may be used. Then, the control unit 50 has a first threshold value and a second threshold value relating to the outlet pressure. The second threshold value is larger than the first threshold value.

Additionally, the control unit 50 may be a component of the internal combustion engine 100. Further, the control unit 50 may be a component of the turbocharger 1. For example, when the control unit 50 is a component of the turbocharger 1, the turbocharger 1 selects a mode of the valve portion 43 after receiving the control data from the internal combustion engine 100. Then, the turbocharger 1 outputs a control signal. For example, when the control unit 50 is a component of the internal combustion engine 100, the turbocharger 1 changes the mode of the valve portion 43 in response to the control signal after receiving the control signal indicating the mode of the valve portion 43

Figure 4:
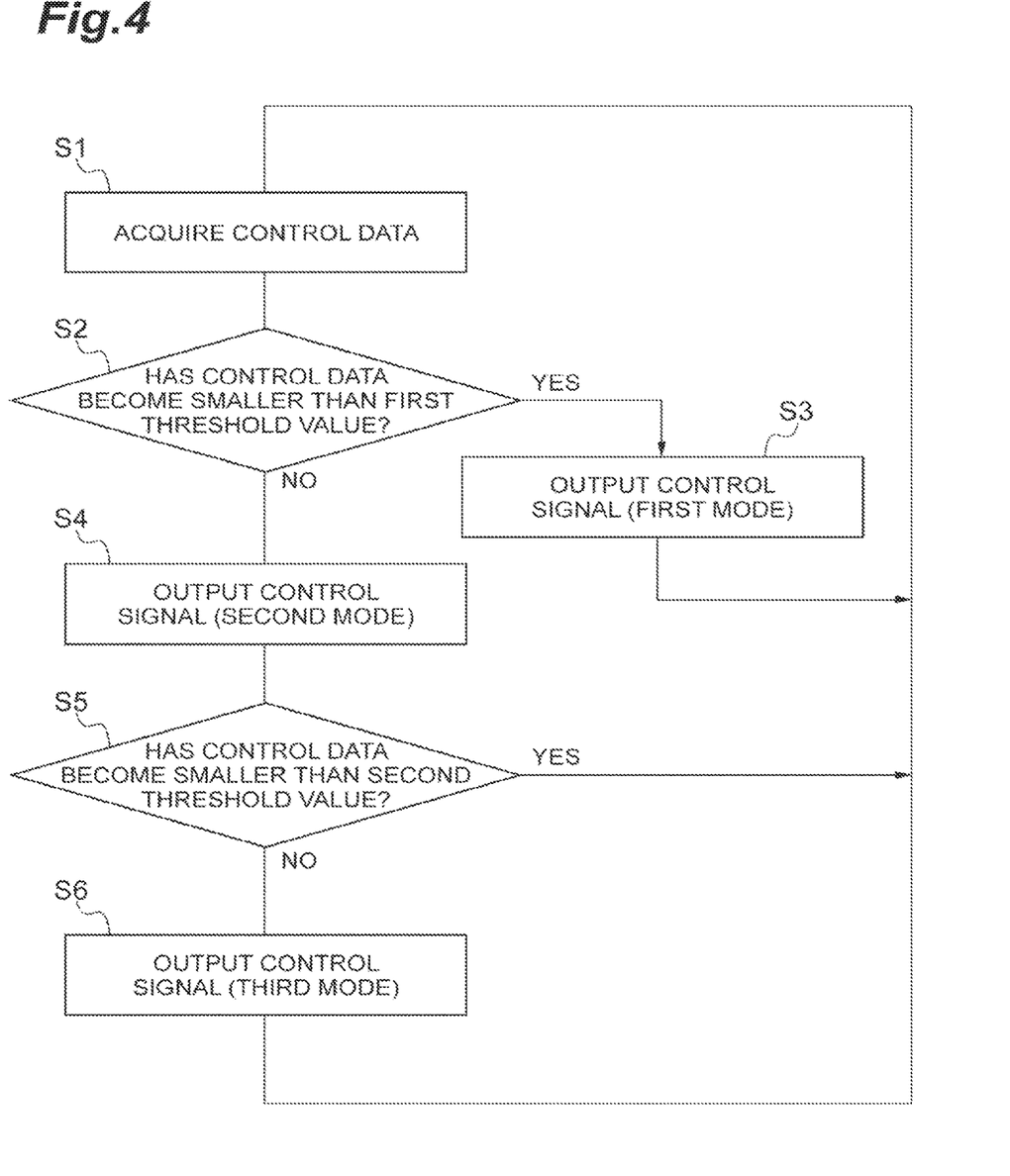
FIG. 4 is a flowchart illustrating an operation of a control unit.

As illustrated in FIG. 4, the control unit 50 first acquires control data (step S1). Next, the control unit 50 determines whether the control data is smaller than a first threshold value (step S2). When the control data is smaller than the first threshold value (step S2: YES), the control unit 50 outputs a control signal of setting the valve portion 43 to the first mode (see FIG. 3(a)) to the valve portion 43 (step S3). That is, the valve portion 43 blocks both of the hub side bypassing hole 42a and the shroud side bypassing hole 42b. Then, the control unit 50 acquires the control data again (step S1). Meanwhile, when the control data is larger than the first threshold value (step S2: NO), the control unit 50 outputs a control signal of opening one corresponding valve of the hub side valve 43a and the shroud side valve 43b to the valve portion 43. Here, the "correspondence" means a relationship between the control variable and the valve. Specifically, this means a valve provided in a scroll having a small cross-sectional area of two valves. Thus, the "corresponding one side" means the shroud side valve 43b provided in the shroud side scroll 23 having a small cross-sectional area. In short, when the control data is larger than the first threshold value (step S2: NO), the control unit 50 outputs a control signal of setting the valve portion 43 to the second mode (see FIG. 3(b)) to the valve portion 43 (step S4). That is, the valve portion 43 closes the hub side bypassing hole 42a, but opens the shroud side bypassing hole 42b.

Next, the control unit 50 determines whether the control data is smaller than the second threshold value (step S5). When the control data is smaller than the second threshold value (step S5: YES), the control unit 50 acquires the control data again (step S1). Meanwhile, when the control data is larger than the second threshold value (step S5: NO), the control unit 50 outputs a control signal of further opening other of the hub side valve 43a and the shroud side valve 43b to the valve portion 43. Specifically, one valve of two valves is the shroud side valve 43b. Thus, the other valve is the hub side valve 43a. In short, when the control data is larger than the second threshold value (step S5: NO), the control unit 50 outputs a control signal of setting the valve portion 43 to the third mode (see FIG. 3(c)) to the valve portion 43 (step S6). That is, the valve portion 43 opens both of the hub side bypassing hole 42a and the shroud side bypassing hole 42b. Then, the control unit 50 acquires the control data (step S1).

Again, as illustrated in FIG. 2, the turbine impeller 7 includes the hub 25 which constitutes a main body thereof and a blade 29 which is provided on the hub 25. The hub 25 is a rotation body which can obtain a predetermined curve (hub line) about the rotation axis AX. A shaft 9 is provided on a turbine end surface 19 of the hub 25. A plurality of blades 29 are uprightly provided on a slope surface 31 of the hub 25. The hub 25 and the blade 29 are integrally molded with each other. Further, the hub 25 rotates along with the blade 29. That is, a proximal end of the blade 29 is near the hub 25. An opposite distal end of the blade 29 is disposed near the shroud. Thus, the blade 29 is disposed between the hub 25 and the shroud 17.

The blade 29 includes a leading edge 26, a trailing edge 27, and an end edge 28. The leading edge 26 is an edge which receives the working fluid G1 from the hub side scroll 22 and the shroud side scroll 23. The trailing edge 27 is an edge for discharging the working fluid G1. The end edge 28 is an edge which connects the leading edge 26 and the trailing edge 27. Thus, the leading edge 26 faces the outlet of the scroll portion 8. Further, the end edge 28 faces the shroud 17. The outlet of the scroll portion 8 includes a hub side outlet and a shroud side outlet of the shroud side scroll 23. That is, the blade 29 of the turbocharger 1 receives the working fluid G1 flowing out of the hub side scroll 22 and the working fluid G1 flowing out of the shroud side scroll 23. The turbocharger 1 with such a configuration is a so-called asymmetrically dual scroll type.

Figure 5:
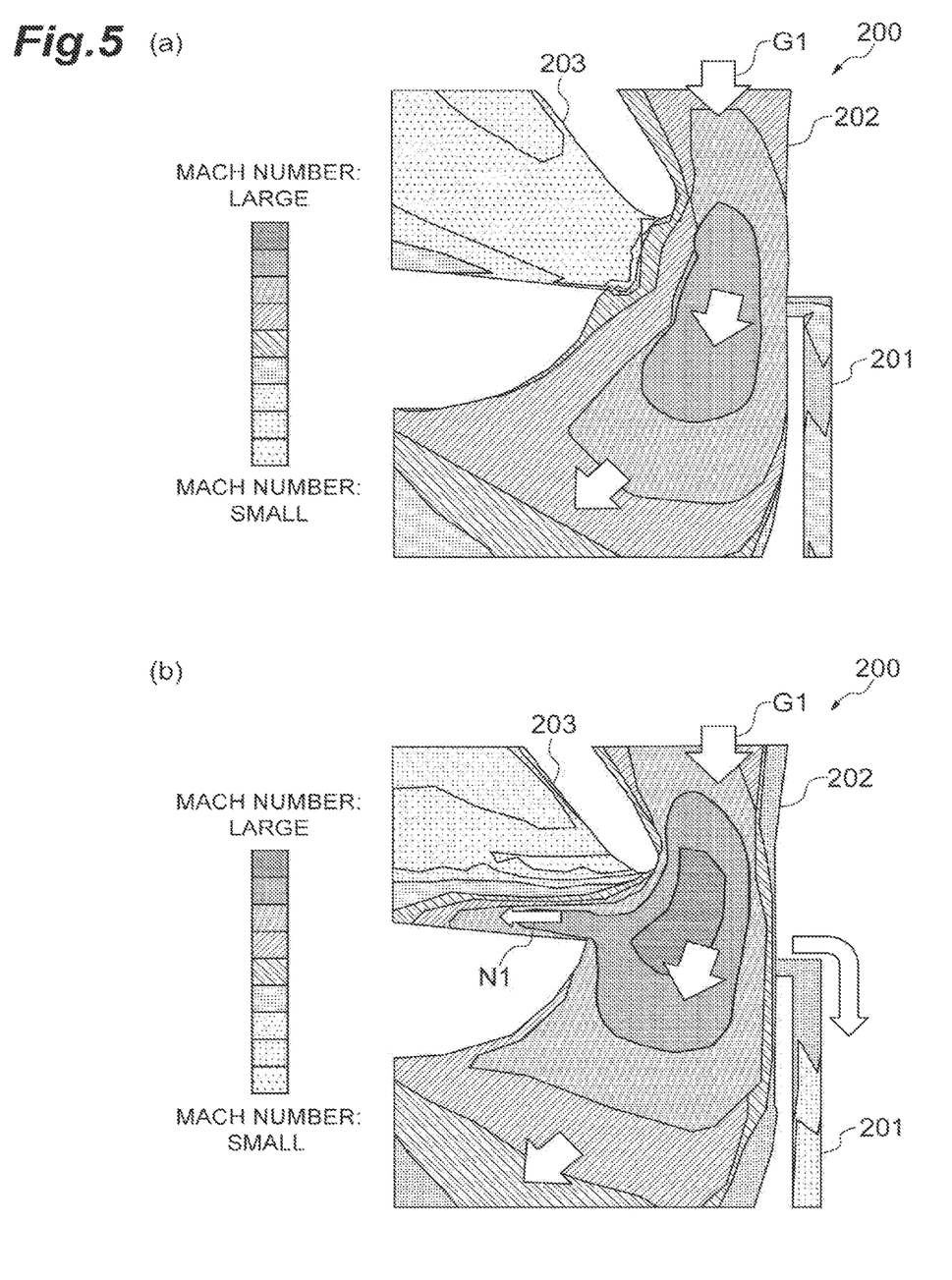
FIG. 5 is a contour diagram illustrating characteristics of a turbocharger according to a comparative example.
Figure 6:
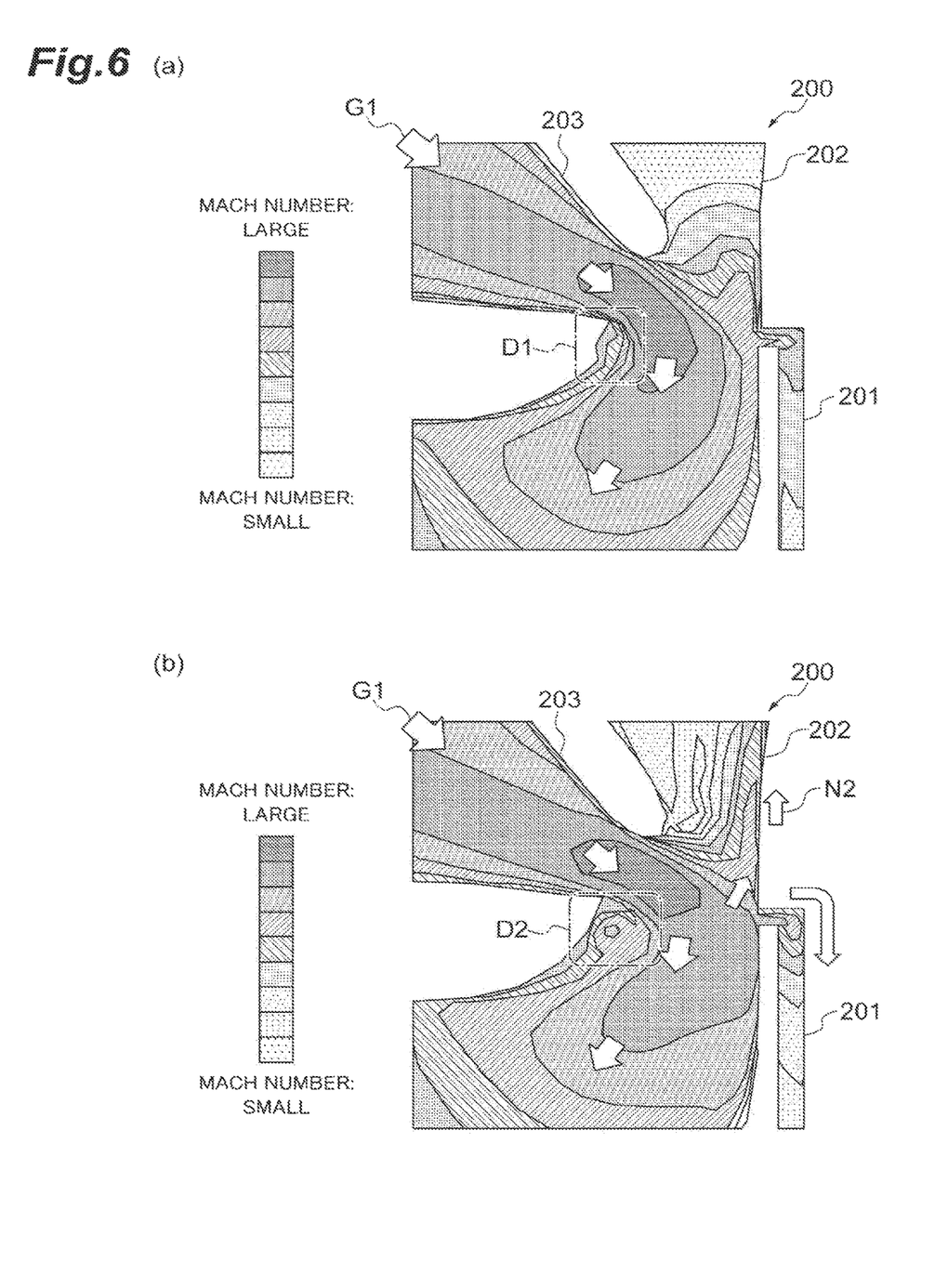
FIG. 6 is a contour diagram illustrating characteristics of the turbocharger according to the comparative example.

Hereinafter, the operation and effect of the turbocharger 1 according to the disclosure will be described. Before the description, a turbocharger 200 including a waste gate structure 201 according to a comparative example will be exemplified (see FIGS. 5 and 6). Then, a result obtained by examining the characteristics of the turbocharger 200 will be described. In the waste gate structure 201 of the turbocharger 200 according to the comparative example, an operation of opening and closing the hub side bypassing hole is synchronized with an operation of opening and closing the shroud side bypassing hole. In other words, the waste gate structure 201 of the turbocharger 200 includes only two modes. That is, the waste gate structure 201 includes a mode in which all of the hub side bypassing hole and the shroud side bypassing hole are closed and a mode in which all of the hub side bypassing hole and the shroud side bypassing hole are opened.

In the turbocharger 200 according to the comparative example, the state of the working fluid G1 in the vicinity of the outlets of the hub side scroll 202 and the shroud side scroll 203 was checked by a numerical calculation.

The contour diagrams illustrated in FIGS. 5(a) and 5(b) illustrate the distribution of Mach number of the working fluid G1 when the working fluid G1 flows from the hub side scroll 202. In the contour diagram, a relatively thick hatching indicates a case in which Mach number is large. Meanwhile, a relatively thin hatching indicates a case in which Mach number is small. Then, FIG. 5(a) illustrates the distribution of Mach number in the mode in which all of the hub side bypassing hole and the shroud side bypassing hole are closed. FIG. 5(b) illustrates the distribution of Mach number in the mode in which all of the hub side bypassing hole and the shroud side bypassing hole are opened.

As illustrated in FIG. 5(a), a flow directed from the hub side scroll 202 toward the turbine impeller (not illustrated) was generated in the mode in which all of the hub side bypassing hole and the shroud side bypassing hole were closed. Meanwhile, as illustrated in FIG. 5(b), a flow (an arrow N1) directed toward the shroud side scroll 203 was generated in addition to the flow directed from the hub side scroll 202 toward the turbine impeller in the mode in which all of the hub side bypassing hole and the shroud side bypassing hole were opened. Specifically, a main flow portion was widened in the direction of the rotation axis AX so that a radial velocity component decreased. In this state, the flow angle increases. As a result, incident loss tends to increase.

The contour diagrams illustrated in FIGS. 6(a) and 6(b) illustrate the distribution of Mach number of the working fluid G1 when the working fluid G1 flows from the shroud side scroll 203. Then, FIG. 6(a) illustrates the distribution of Mach number in the mode in which all of the hub side bypassing hole and the shroud side bypassing hole are closed. FIG. 6(b) illustrates the distribution of Mach number in the mode in which all of the hub side bypassing hole and the shroud side bypassing hole are opened.

As illustrated in FIG. 6(a), a flow directed from the shroud side scroll 203 toward the turbine impeller 7 was generated in the mode in which all of the hub side bypassing hole and the shroud side bypassing hole were closed. Meanwhile, as illustrated in FIG. 6(b), a reverse flow (an arrow N2) directed toward the hub side scroll 202 was generated in addition to the flow directed from the shroud side scroll 203 toward the turbine impeller in the mode in which all of the hub side bypassing hole and the shroud side bypassing hole were opened. Then, a deviation in the direction of the rotation axis AX became large by the reverse flow. As a result, a flow separation increased in the vicinity of the outlet of the shroud side scroll 23 (see a region D1 of FIG. 6(a) and a region D2 of FIG. 6(b)).

As a result obtained by examining the characteristics of the turbocharger 200 according to the comparative example, the above-described loss occurred in the control using the mode of closing all of the hub side bypassing hole and the shroud side bypassing hole and the mode of opening all of the hub side bypassing hole and the shroud side bypassing hole. In view of the characteristics of the turbocharger 200 according to the comparative example, the turbocharger 1 of the disclosure suppresses the occurrence of the above-described loss. As a result, the turbocharger 1 suppresses deterioration in efficiency.

Specifically, the turbocharger 1 guides the working fluid G1 provided from the internal combustion engine 100 to the turbine impeller 7 through the scroll portion 8 of the turbine housing 6. Then, the working fluid G1 is discharged from the discharge port 18 of the turbine housing 6 to the outside. Here, the cross-sectional area of the passage of the hub side scroll 22 is larger than the cross-sectional area of the passage of the shroud side scroll 23. Thus, the state of the working fluid G1 flowing in the hub side scroll 22 and the state of the working fluid G1 flowing in the shroud side scroll 23 can be set to be different from each other on purpose. Then, a part of the working fluid G1 is guided from each of the scrolls 22 and 23 to the discharge port 18 through the bypassing passage portion 42 without passing through the turbine impeller 7 in response to the state of the working fluid G1 flowing in each of the scrolls 22 and 23. Here, the inflow of the working fluid G1 to the bypassing passage portion 42 is controlled by the hub side valve 43a and the shroud side valve 43b. In the hub side valve 43a and the shroud side valve 43b, one valve opening and closing operation is independent from the other valve opening and closing operation. That is, it is possible to open the shroud side valve 43b while closing the hub side valve 43a. Accordingly, it is possible to perform valve control independent for each of the scrolls 22 and 23 so as to obtain a desired state of the working fluid G1. As a result, it is possible to suppress, for example, the reverse flow (see an arrow N1 of FIG. 5(b) and an arrow N2 of FIG. 6(b)) from the passage supplying the working fluid G1 to the passage not supplying the working fluid. Further, it is possible to suppress the occurrence of, for example, the separation (a region D2 of FIG. 6(b)) of the working fluid G1. Thus, the turbocharger 1 can suppress deterioration in efficiency.

The valve portion 43 includes a first mode in which the hub side valve 43a and the shroud side valve 43b are closed and a second mode in which the hub side valve 43a and the shroud side valve 43b are opened. The valve portion 43 sets the second state in which the control variable is larger than the first threshold value when the control variable is equal to or smaller than the first threshold value. The shroud side scroll 23 is formed so that the cross-sectional area of the passage is smaller than that of the hub side scroll 22. As a result, the state of the working fluid G1 flowing in the shroud side scroll 23 reaches a limit state at a timing earlier than the state of the working fluid G1 flowing in the hub side scroll 22. However, the state of the working fluid G1 flowing in the hub side scroll 22 has an allowance to the limit state. That is, when the control variable is larger than the first threshold value, the state of the working fluid G1 flowing in the hub side scroll 22 is not in the limit state. Meanwhile, when the control variable is larger than the first threshold value, the state of the working fluid G1 flowing in the shroud side scroll 23 reaches the limit state. Here, the second mode of opening the shroud side valve 43b and closing the hub side valve 43a is set. As a result, the turbocharger 1 can perform control corresponding to each of the scrolls 22 and 23. Thus, the turbocharger 1 can appropriately suppress deterioration in efficiency.

The valve portion 43 further includes a third state in which the hub side valve 43a and the shroud side valve 43b are opened. The valve portion 43 sets the third state when the control variable is larger than the second threshold value which is larger than the first threshold value. A state in which the control variable exceeds the second threshold value is a state in which both of the working fluid G1 flowing in the hub side scroll 22 and the working fluid G1 flowing in the shroud side scroll 23 have reached a limit state. Here, both of the hub side valve 43a and the shroud side valve 43b are opened. As a result, the turbocharger 1 can perform control corresponding to each of the scrolls 22 and 23. Thus, the turbocharger 1 can further appropriately suppress deterioration in efficiency.

The shroud side scroll 23 may be disposed near the discharge port 18 in relation to the hub side scroll 22 in the direction of the rotation axis AX. According to this configuration, it is possible to perform control corresponding to each of the scrolls 22 and 23 in the compact turbocharger 1. Thus, the turbocharger 1 can appropriately suppress deterioration in efficiency.

As described above, the turbocharger 1 according to the disclosure has been described in detail. However, the turbocharger 1 according to the disclosure is not limited to the above-described contents. The turbocharger 1 according to the disclosure can be modified into various forms in a range not departing from the spirit thereof.

In order to set the cross-sectional area of the hub side scroll 22 and the cross-sectional area of the shroud side scroll 23 to be different from each other, the cross-sectional area of the hub side scroll 22 is set to be larger than the cross-sectional area of the shroud side scroll 23. However, the disclosure is not limited to this configuration. The cross-sectional area of the shroud side scroll 23 may be set to be larger than the cross-sectional area of the hub side scroll 22.

Additionally, the cross-sectional area of the hub side scroll 22 and the cross-sectional area of the shroud side scroll 23 which are described above can be defined as below. That is, the cross-sectional area of the scroll is an area which is surrounded by the inner wall of the scroll portion and the lines (dashed lines L1 and L2 of the drawings) in which a distance between the center partition (the partition wall portion 24) and the wall surfaces on the side of the bearing housing and the turbine outlet at an arbitrary circumferential position becomes minimal. In other words, the cross-sectional area of the scroll may be an area of a part which is surrounded by the inner wall of the turbine housing and the lines (dashed lines L1 and L2 of the drawings) in which a distance between the wall surfaces on the side of the bearing housing and the turbine outlet facing the partition and the partition at each circumferential position becomes minimal.

REFERENCE SIGNS LIST

1: turbocharger, 2: turbine, 3: compressor, 4: connection portion, 6: turbine housing, 7: turbine impeller, 8: scroll portion, 9: shaft, 11: compressor impeller, 12: bearing, 13: compressor housing, 14: bearing housing, 16: housing end surface, 17: shroud, 18: discharge port, 19: turbine end surface, 21: housing side surface, 22: hub side scroll, 23: shroud side scroll, 24: partition wall portion, 25: hub, 26: leading edge, 27: trailing edge, 28: edge, 29: blade, 31: slope surface, 41: waste gate mechanism, 42: bypassing passage portion, 42a: hub side bypassing hole, 42b: shroud side bypassing hole, 42c: main bypassing passage, 43: valve portion, 43a: hub side valve, 43b: shroud side valve, 50: control unit, 100: internal combustion engine, 200: turbocharger, 201: waste gate structure, 202: hub side scroll, 203: shroud side scroll, G1: working fluid.

The invention claimed is:

1. A turbocharger comprising:
a hub side scroll;
a shroud side scroll which separates from the hub side scroll by a partition wall portion and having a cross-sectional area different from that of the hub side scroll;
a waste gate mechanism which includes a hub side bypassing hole communicating with the hub side scroll, a hub side valve disposed in the hub side bypassing hole, a shroud side bypassing hole communicating with the shroud side scroll, and a shroud side valve disposed in the shroud side bypassing hole; and
a control unit which controls an operation of the valve portion based on a control variable receiving from at least one sensor and a predetermined threshold value;
wherein when the control variable of a working fluid flowing to one of the hub side scroll and the shroud side scroll is larger than a first threshold value, the control unit operates the valve portion so that one corresponding valve of the hub side valve and the shroud side valve is opened and the other valve of the hub side valve and the shroud side valve is closed.

2. The turbocharger according to claim 1,
wherein when the control variable of the working fluid flowing to the other of the hub side scroll and the shroud side scroll is larger than a second threshold value which is larger than the first threshold value, the control unit controls the valve portion so that the other valve of the hub side valve and the shroud side valve is opened.

3. The turbocharger according to claim 1, further comprising:
a turbine impeller which rotates by using a predetermined axis as a rotation axis; and
a housing including the hub side scroll and the shroud side scroll, the housing being formed to surround the turbine impeller and supplying a working fluid to the turbine impeller and a discharge portion discharging the working fluid passing through the turbine impeller;
wherein the housing includes a housing end surface facing a compressor of the turbocharger, the housing end surface being a surface which is opposite to the discharge portion discharging the working fluid with respect to the rotation axis, and the housing end surface being adjacent to a reference plane;
wherein the first scroll is provided near the reference plane; and
wherein the partition wall portion extends in an extension direction inclined with respect to the reference plane, an angle formed by the extension direction of the partition wall portion and the reference plane being greater than or equal to 30° and less than or equal to 50°.

4. A turbocharger comprising:
a turbine impeller which rotates by using a predetermined axis as a rotation axis;
a housing which includes a scroll portion formed to surround the turbine impeller and supplying a working fluid to the turbine impeller and a discharge portion discharging the working fluid passing through the turbine impeller;
a bypassing passage portion of which a first end is connected to the scroll portion and a second end is connected to the discharge portion and which guides the working fluid from the scroll portion to the discharge portion;
a valve portion which is provided in the bypassing passage portion and controls an inflow of the working fluid from the scroll portion to the discharge portion; and
a control unit which controls an operation of the valve portion based on a control variable receiving from at least one sensor and a predetermined threshold value;
wherein the scroll portion includes a first scroll and a second scroll;
wherein the first scroll is formed so that a cross-sectional area of a passage is larger than that of the second scroll;
wherein the valve portion includes a first valve and a second valve, wherein the first valve controls the inflow of the working fluid from the first scroll to the bypassing passage portion, wherein the second valve controls the inflow of the working fluid from the second scroll to the bypassing passage portion;
wherein the operation of the valve portion includes a first state in which the first valve and the second valve are closed so that the inflow of the working fluid from the first scroll and the second scroll to the bypassing passage portion is stopped, and a second state in which the first valve is closed and the second valve is opened so that the inflow of the working fluid from the first scroll to the bypassing passage portion is stopped and the inflow of the working fluid from the second scroll to the bypassing passage portion is allowed; and
wherein the control unit controls the valve portion to the first state when the control variable is equal to or smaller than a first threshold value and sets the valve portion to the second state when the control variable is larger than the first threshold value.

5. The turbocharger according to claim 4,
wherein the operation of the valve portion further includes a third state in which the first valve and the second valve are opened so that the inflow of the working fluid from the first scroll and the second scroll to the bypassing passage portion is allowed; and
wherein the control unit controls the valve portion to the third state when the control variable is larger than a second threshold value which is larger than the first threshold value.

6. The turbocharger according to claim 5, wherein the second scroll is disposed near the discharge portion in relation to the first scroll in an axial direction.

7. The turbocharger according to claim 4, wherein the second scroll is disposed near the discharge portion in relation to the first scroll in an axial direction.

8. The turbocharger according to claim 4,
wherein the housing includes a housing end surface facing a compressor of the turbocharger, the housing end surface being a surface which is opposite to the discharge portion discharging the working fluid with respect to the rotation axis, and the housing end surface being adjacent to a reference plane;
wherein the first scroll is provided near the reference plane; and
wherein the first scroll and the second scroll are separated from each other by a partition wall portion extending in an extension direction inclined with respect to the reference plane, an angle formed by the extension direction of the partition wall portion and the reference plane being greater than or equal to 30° and less than or equal to 50°.

* * * * *